(12) United States Patent
Dillard (10) Patent No.: US 8,408,840 B2
(45) Date of Patent: Apr. 2, 2013

(54) AEROBIC IRRIGATION CONTROLLER

(76) Inventor: Dennis Dillard, Tomball, TX (US)

( * ) Notice: Subject to any disclaimer, the term of this patent is extended or adjusted under 35 U.S.C. 154(b) by 339 days.

(21) Appl. No.: 12/872,128

(22) Filed: Aug. 31, 2010

(65) Prior Publication Data

US 2012/0048385 A1    Mar. 1, 2012

(51) Int. Cl.
*A01G 25/00*    (2006.01)
(52) U.S. Cl. .......................................................... 405/36
(58) Field of Classification Search .................... 405/37, 405/36
See application file for complete search history.

(56) References Cited

U.S. PATENT DOCUMENTS

| | | | |
|---|---|---|---|
| 1,820,976 A | 9/1931 | Imhoff | |
| 2,364,298 A | 12/1944 | Kamp | |
| 2,541,630 A | 2/1951 | Yeomans | |
| 2,809,933 A | 10/1957 | Halvorson | |
| 3,275,149 A | 9/1966 | Ludwig et al. | |
| 3,620,371 A | 11/1971 | Valdespino | |
| 3,844,946 A * | 10/1974 | Farrell, Jr. ................... | 210/104 |
| 3,873,445 A | 3/1975 | Brusard | |
| 3,915,857 A | 10/1975 | Olson | |
| 3,920,550 A | 11/1975 | Farrell, Jr. et al. | |
| 3,926,808 A * | 12/1975 | Goddard ..................... | 210/195.1 |
| 3,931,907 A | 1/1976 | Henle | |
| 4,168,233 A | 9/1979 | Anderson | |
| 4,215,716 A * | 8/1980 | Klenk et al. ............... | 137/527.4 |
| 4,306,968 A | 12/1981 | Yost | |
| 4,442,006 A | 4/1984 | Ishida et al. | |
| 4,442,007 A | 4/1984 | Rehm | |
| 5,086,800 A | 2/1992 | Dunn | |
| 5,354,471 A | 10/1994 | Timpany | |
| 5,527,453 A * | 6/1996 | Hachima ..................... | 210/150 |
| 5,587,320 A | 12/1996 | Shindo et al. | |
| 5,888,394 A | 3/1999 | Jan | |
| 5,961,831 A | 10/1999 | Lee et al. | |
| 5,985,139 A * | 11/1999 | Zoeller ........................ | 210/85 |
| 6,068,773 A | 5/2000 | Sheaffer | |
| D430,919 S | 9/2000 | Claussen | |
| 6,171,499 B1 | 1/2001 | Bouchalat | |

(Continued)

FOREIGN PATENT DOCUMENTS

| AU | 9671922 A | * 5/1997 |
|---|---|---|
| CN | 1115178 A |   1/1996 |

(Continued)

*Primary Examiner* — John Kreck
(74) *Attorney, Agent, or Firm* — Charles Knobloch; Arnold, Knobloch & Saunders, L.L.P.

(57) ABSTRACT

An apparatus, method, and system for supplementing an aerobic-treated supply of water in an aerobic sewer pump tank using water from a separate source, the apparatus including an electronic controller device to control the occurrence of injection of water from a separate source at a first predetermined time and for a predetermined length of time. A valve member is in electrical controlling communication with the electronic controller device. An inlet connection member is disposed on one end of the control valve. A conduit member has one end disposed on the other opening end of the control valve. The conduit member further includes a flow redirection member. The flow redirection member injects the separate source water into the receiving orifice of a normally closed trap sealer. The trap sealer deposits the separate source water into the pump tank. A housing member positions the conduit member and the trap sealer. The trap sealer and conduit member are positioned and arranged to prevent liquid flow from the trap sealer to the conduit member. An overflow sensor is arranged and configured to be capable of preventing actuation of the control valve into an open state if the pump tank is filled to a predetermined level.

8 Claims, 6 Drawing Sheets

U.S. PATENT DOCUMENTS

| | | |
|---|---|---|
| 6,296,766 B1 | 10/2001 | Breckenridge |
| 6,325,091 B1 * | 12/2001 | Perrott et al. ............ 137/247.25 |
| 6,328,882 B1 * | 12/2001 | Rosenblatt .................. 210/104 |
| 6,379,546 B1 | 4/2002 | Braun |
| 6,461,510 B1 | 10/2002 | Boles et al. |
| 6,896,804 B2 | 5/2005 | Haerther et al. |
| 7,118,677 B2 | 10/2006 | Hoffjann |
| 7,323,107 B2 | 1/2008 | Ames et al. |
| 7,556,736 B2 | 7/2009 | Price et al. |
| 7,736,508 B2 | 6/2010 | Limacaco |
| 2008/0296220 A1 | 12/2008 | Fry et al. |
| 2010/0105128 A1 | 4/2010 | Rezin |

FOREIGN PATENT DOCUMENTS

| | | |
|---|---|---|
| CN | 101195499 A | 6/2008 |
| EP | 0383765 A1 | 8/1990 |
| GB | 411425 | 5/1934 |
| GB | 1359342 | 7/1974 |
| GB | 2440888 A | 2/2008 |
| JP | 56078686 U | 6/1981 |
| JP | 1284395 A | 11/1989 |
| JP | 2222791 A | 9/1990 |
| SE | 462545 A | 7/1990 |
| WO | 9424056 | 10/1994 |
| WO | 02081387 A1 | 10/2002 |
| WO | 2004002904 A1 | 1/2004 |
| WO | 2006053020 A2 | 5/2006 |
| WO | 2009041885 A1 | 4/2009 |

* cited by examiner

AEROBIC IRRIGATION CONTROLLER

FIELD OF THE INVENTION

This invention relates to irrigation provided from an aerobic wastewater treatment system.

BACKGROUND

Aerobic water treatment systems are widely used in the place of sewer and septic systems. In many installations, the treated water is dispersed into a distribution field. A distribution field is sometimes called a spray field. The dispersed water may be sprayed onto the distribution field or the dispersed water may leach into the ground of the distribution field through underground piping. A spin-off benefit of an aerobic water treatment system is that the vegetation in the distribution system is irrigated. This provides significant economy through reduced water usage.

The inventor discovered a problem with using an aerobic system for irrigation in that the aerobic system will fail to meet irrigation needs due to variations in aerobic system use. This may occur in installations at weekend homes or even at homes where the homeowners leave for extended periods of time, such as to take a summer vacation. The situation is more acute in locations that have a highly variable amount of natural rainfall, where dry spells may parch vegetation if not artificially irrigated.

Another discovered problem is that aerobic ejection pumps will seize when not in use for extended periods. Since ejection pumps typically have a low-level shut off float, these pumps will not operate when waste water is not being fed into the aerobic treatment system. The inventor has recognized a need for cycling of the ejection pump on a scheduled basis. Another associated problem is that sludge does accumulate in aerobic system treated water pump tanks Running the ejection pumps in low water level conditions increases the chances for the ejection pump to pump sludge into the piping going to the distribution field. This causes opportunity for clogging of pipes and spray heads and pollutes the spray field.

One solution may be to supplement watering of the distribution field with a separate irrigation system. This is expensive as it results in two irrigation systems over the same lawn area. Further, the separate set of irrigation spray heads present the potential for cross contamination with the aerobic spray. Therefore, it is generally not allowed to directly mix both treated water and fresh water. Also, the amount of irrigation water from the aerobic treatment system is not coordinated with the amount of irrigation water from the separate irrigation system. Waste would occur unless sophisticated coordination is retrofitted into the controller for the aerobic treatment system. The question becomes how to supplement the irrigation water that is provided by the aerobic system in a coordinated manner.

Therefore, in certain environments and conditions, aerobic irrigation is practically useless because there is not a reliable supply of irrigation water to the distribution field. If separate supplemental irrigation is provided, it is very costly to have duplicate irrigation systems. Further, even with a duplicate irrigation system then cross contamination is possible and highly undesirable. Having two independent systems causes excessive water and unnecessary water usage by these two independent systems.

One solution would be to simply add water to the intake of the aerobic treatment system. This, however, is undesirable because this would greatly dilute the treatment tanks at a time when the amount of waste water entering the system is at a minimum. The microbial activity would be damaged. However, as mentioned previously, adding water post aerobic treatment is fraught with the problem of cross-contamination of the fresh water supply with the treated water from the aerobic treatment system.

Upon recognizing the problem, the inventor investigated and discovered several needs that must be met in order to meet the need for an ability to supplement with potable water the aerobic-treated irrigation water that is delivered to a spray field. The potable water supply must not be subject to contamination by the treated water from the aerobic system. It is highly desirable to solve the irrigation problem without modifying the aerobic system itself It is desirable and economically advantageous to avoid duplicating the irrigation system already provided by the aerobic system in the spray field. There is a need to avoid doubling water usage or causing excess water usage through uncoordinated watering. The aerobic system must not be allowed to leak gasses. There is a need to preserve or not interfere with the microbial activity in the aerobic treatment tanks There is a need to not cause the aerobic treatment system or the treated water to overflow. In supplementing the treated water from the aerobic system, back flow and back siphonage into the separate potable water supply must be prevented.

The inventor has conceived of topping off the treated water from the aerobic treatment system using a ready source of potable water. The challenge is to solve the problem of topping off while at the same time preventing backflow and siphoning of the aerobic water into the separate potable water source, yet also prevent gases from escaping, while also not requiring modification of the existing aerobic system. The inventor has discovered a pre-engineered solution that is generally robust in allowing retrofit installation on a wide variety of aerobic systems. In the process, several unanticipated benefits have been realized, including protection of the aerobic system ejection pump and avoidance of irrigation head clogging.

Therefore, the inventor has addressed two problems. The first is insuring that irrigation needs are met and second, that the aerobic system remains functional if left unused for long periods of time.

SUMMARY

In a first set of examples, an apparatus for supplementing an aerobic-treated supply of water in an aerobic sewer pump tank using water from a separate source is disclosed, the apparatus including an electronic controller device configured and arranged to control the occurrence of injection of water from a separate source at a first predetermined time and for a predetermined length of time; an electrically actuated control valve member in electrical controlling communication with the electronic controller device; an inlet connection member disposed on one end of the control valve; a conduit member having one end disposed on the other opening end of the control valve, the conduit member further comprising a flow redirection member; a normally closed trap sealer having a receiving orifice, a fluid holding chamber, and an openable drainage orifice, the trap sealer positioned and arranged to prevent gaseous communication from the pump tank to the atmosphere; where the flow redirection member is positioned and arranged to inject the separate source water into the receiving orifice of the trap sealer; where the receiving orifice of the trap sealer is positioned and arranged to receive the separate source water injected from the flow redirection member; and where the normally closed trap sealer is positioned and arranged to be capable of depositing the separate source water into the pump tank upon receipt of injected separate source water; a housing member positioning and arranging the conduit member and the trap sealer, the trap sealer and conduit member positioned and arranged to prevent liquid flow from the trap sealer to the conduit member; and an electronic overflow detector in electrical communication with the controller device; and where the overflow detector and controller device are arranged and configured to be capable of preventing actuation of the control valve into an open state if the pump tank is filled to a predetermined level.

In another example, the apparatus has an electricity producing solar collector disposed on an outer surface of the housing; a rechargeable electrical storage battery disposed within the housing; and where the solar collector is in electrical communication with the battery; and where the battery is in electrical communication with the controller.

In another example, the conduit and the trap sealer are positioned and arranged to form an air gap between the opening of the flow redirection member and the receiving orifice of the trap sealer, the vertical distance from the flow redirection member and the receiving orifice of the trap sealer at least 1.5 times the width of the opening of the flow redirection member; and where the housing further includes orifices positioned and arranged to place the air gap in gaseous communication with the atmosphere.

In a second set of examples, a system is disclosed for supplementing an aerobic-treated supply of water in an aerobic sewer pump tank using water from a separate source, the system including a means for controlling the occurrence of a first predetermined time and a predetermined length of time using an electronic controller device; means for injecting, for the predetermined length of time commencing at the first predetermined time, the separate source water through a conduit member, across an air gap, downward into a normally closed trap sealer; where the air gap is in communication with the atmosphere; and where the vertical distance of the air gap between conduit member and trap sealer is at least 1.5 times the width of the opening of the conduit member, whereby liquid flow from the trap sealer to the conduit member is prevented; means for preventing injection if the pump tank is filled to a predetermined level; means for creating a fluid seal in the trap sealer using the injected separate source water; means for opening the trap sealer into the pump tank upon creation of the fluid seal; means for depositing the separate source water into the pump tank upon opening the trap sealer; means for closing the trap sealer upon completing the water injection, whereby gaseous communication from the pump tank to the atmospheric air gap is prevented; and means for pumping the supplemented water from the pump tank at a second predetermined time.

In another example, the system further includes a means for generating electricity using a solar collector; means for storing the generated electricity in a battery; and means for supplying the stored electricity to the means for controlling.

In a third set of examples, a method is disclosed for supplementing an aerobic-treated supply of water in an aerobic sewer pump tank using water from a separate source, the method including: controlling the occurrence of a first predetermined time and a predetermined length of time using an electronic controller device; injecting, for the predetermined length of time commencing at the first predetermined time, the separate source water through a conduit member, across an air gap, downward into a closed trap sealer; where the air gap is in communication with the atmosphere; and where the vertical distance of the air gap between conduit member and trap sealer is at least 1.5 times the width of the opening of the conduit member, whereby liquid flow from the trap sealer to the conduit member is prevented; preventing injection if the pump tank is filled to a predetermined level; creating a fluid seal in the trap sealer using the injected separate source water; opening the trap sealer into the pump tank upon creation of the fluid seal; depositing the separate source water into the pump tank upon opening the trap sealer; closing the trap sealer upon completing the water injection, whereby gaseous communication from the pump tank to the atmospheric air gap is prevented; and pumping the supplemented water from the pump tank at a second predetermined time.

In another example, the method further includes generating electricity using a solar collector; storing the generated electricity in a battery; and supplying the stored electricity to power the controlling step.

BRIEF DESCRIPTION OF THE DRAWINGS

The present invention is best understood with reference to the attached drawings in which like numerals refer to like elements, and in which.

DETAILED DESCRIPTION

Figure 1:
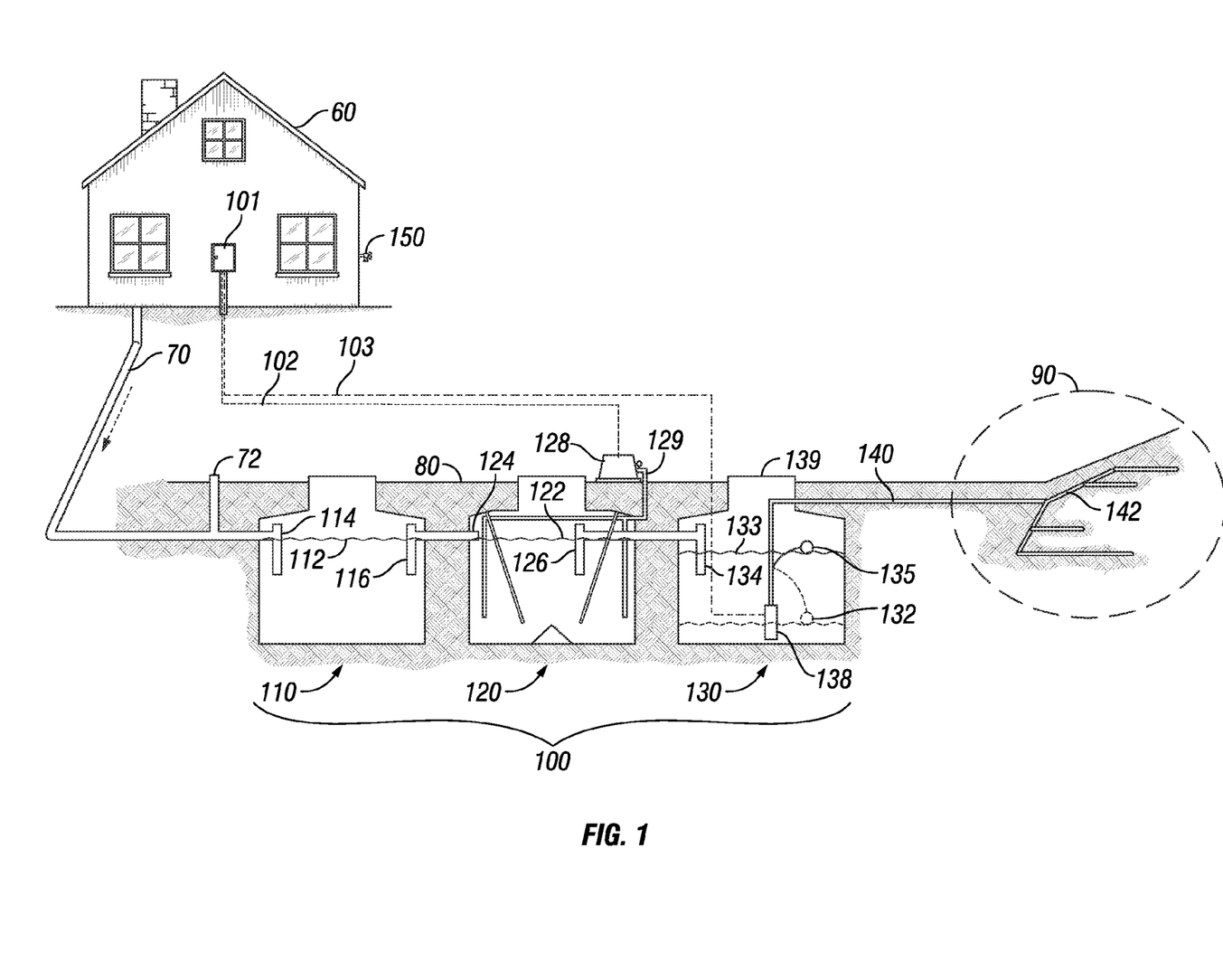
FIG. 1 illustrates a pictorial diagram of an aerobic treatment system and its distribution field.

FIG. 1 is a pictorial diagram of an aerobic treatment system and its distribution field. In this example, building or residence 60 discharges contaminated waste water through a sewer line 70. Sewer line 70 is usually buried below natural ground 80. A sewer clean out 72 is noted. The waste water is emptied into an aerobic system 100. The waste water is treated by aerobic system 100 and the treated water is pumped to a distribution field 90 through treated water discharge piping 140 and distribution piping branches 142. Distribution piping 140 and piping branches 142 may distribute the treated water above ground to the "spray field", distribution field 90. In another example, distribution piping 140 and piping branches 142 are below ground 80; the treated water leaching into distribution field 90.

Details of aerobic system 100 include a pretreatment tank 110 that receives the waste water from sewer line 70, which is received by an inlet 114. Pretreatment tank 110 fills to a certain fluid level 112, after which the waste water in pretreatment tank 110 exits through outlet 116 and deposits into aerobic treatment plant 120.

Inlet 124 of aerobic treatment plant 120 receives the waste water from pretreatment tank 110 for processing. Aerobic treatment plant 120 fills to a certain fluid level 122, after which the water in aerobic treatment plant 120 exits through outlet 126 and deposits into pump tank 130. An air compressor 128 sends compressed air through air line 129 into aerobic treatment plant 120, providing the aeration needed to treat the waste water. Compressor electrical line 102 provides communication from the aerobic system controls 101; in one example controls 101 are located at or near building 60. Aerobic system controls 101 powers air compressor 128.

Inlet 134 of pump tank 130 receives the treated water from aerobic treatment plant 120 for holding. Ejection pump 138 pumps treated water out of pump tank 130 into treated water discharge piping 140 and distribution piping branches 142. From there, the treated water is dispersed onto or into distribution field 90. Ejection pump electrical line 103 provides communication from the aerobic system controls 101. Aerobic system controls 101 determine the time to run ejection pump 138. A float switch 135 measures the fluid level 133 in pump tank 130. Float switch 135 detects the fluid level 133. Float switch 135 detects a low fluid level condition, for example, float switch position 132. In a low fluid level condition, the float switch prevents operation of ejection pump 138. This reduces the risk of burning out the pump and reduces the amount of residual sludge from being pumped into the discharge piping 140, distribution piping branches 142, and distribution field 90. In one example, the timing and duration of the pumping performed by ejection pump 138 is controlled by aerobic system controls 101.

Incidentally, a separate fresh water source 150 is provided, as shown by a spicket on building 60.

Figure 2:
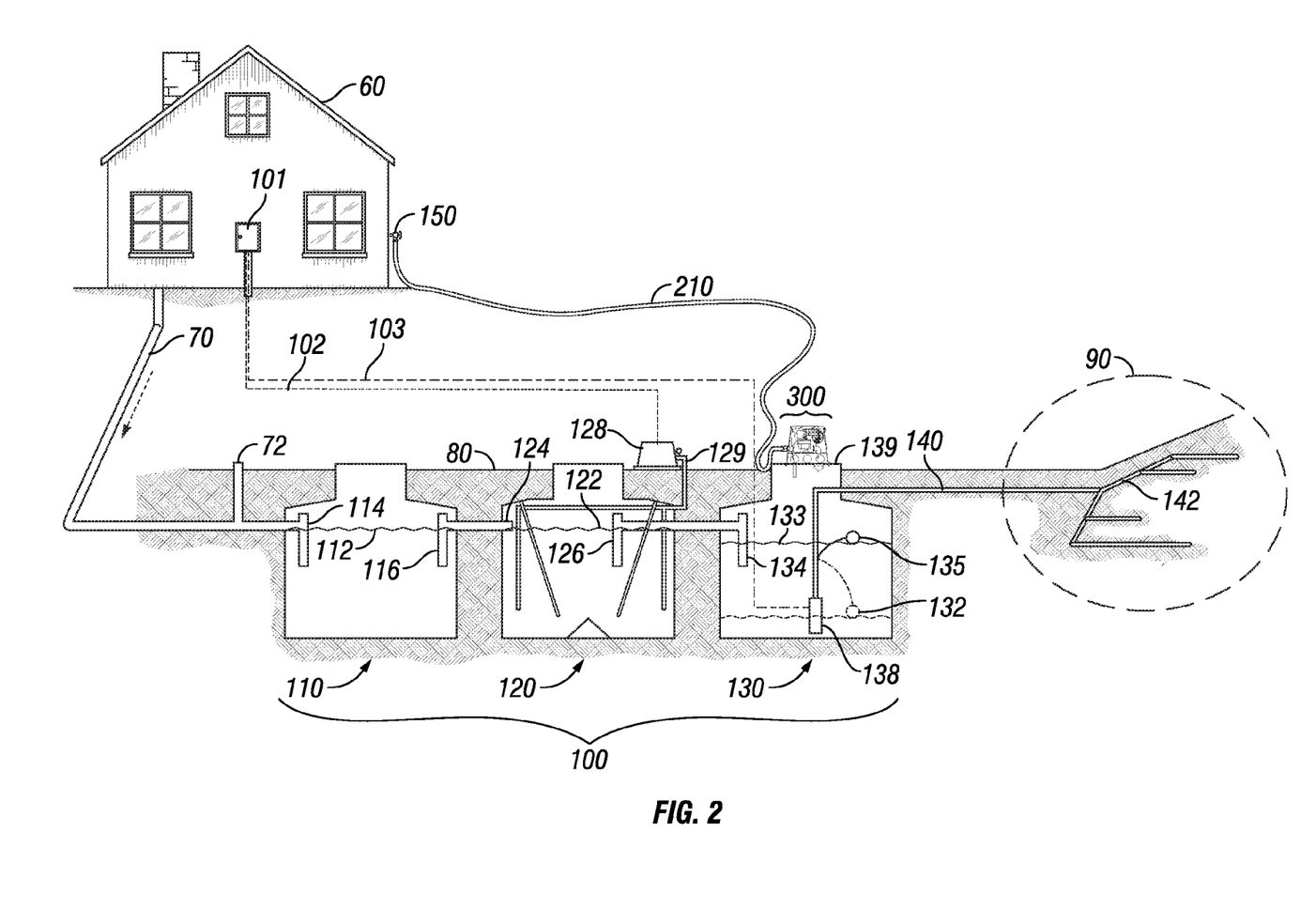
FIG. 2 illustrates a pictorial diagram of an aerobic treatment and irrigation system 100 with the pump cycling apparatus 300 attached to pump tank 130.

FIG. 2 is a pictorial diagram of an aerobic treatment and irrigation system 100 with the pump cycling apparatus 300 attached to pump tank 130. External water source conduit 210 connects external separate water source 150 to pump cycling apparatus 300.

Figure 3:
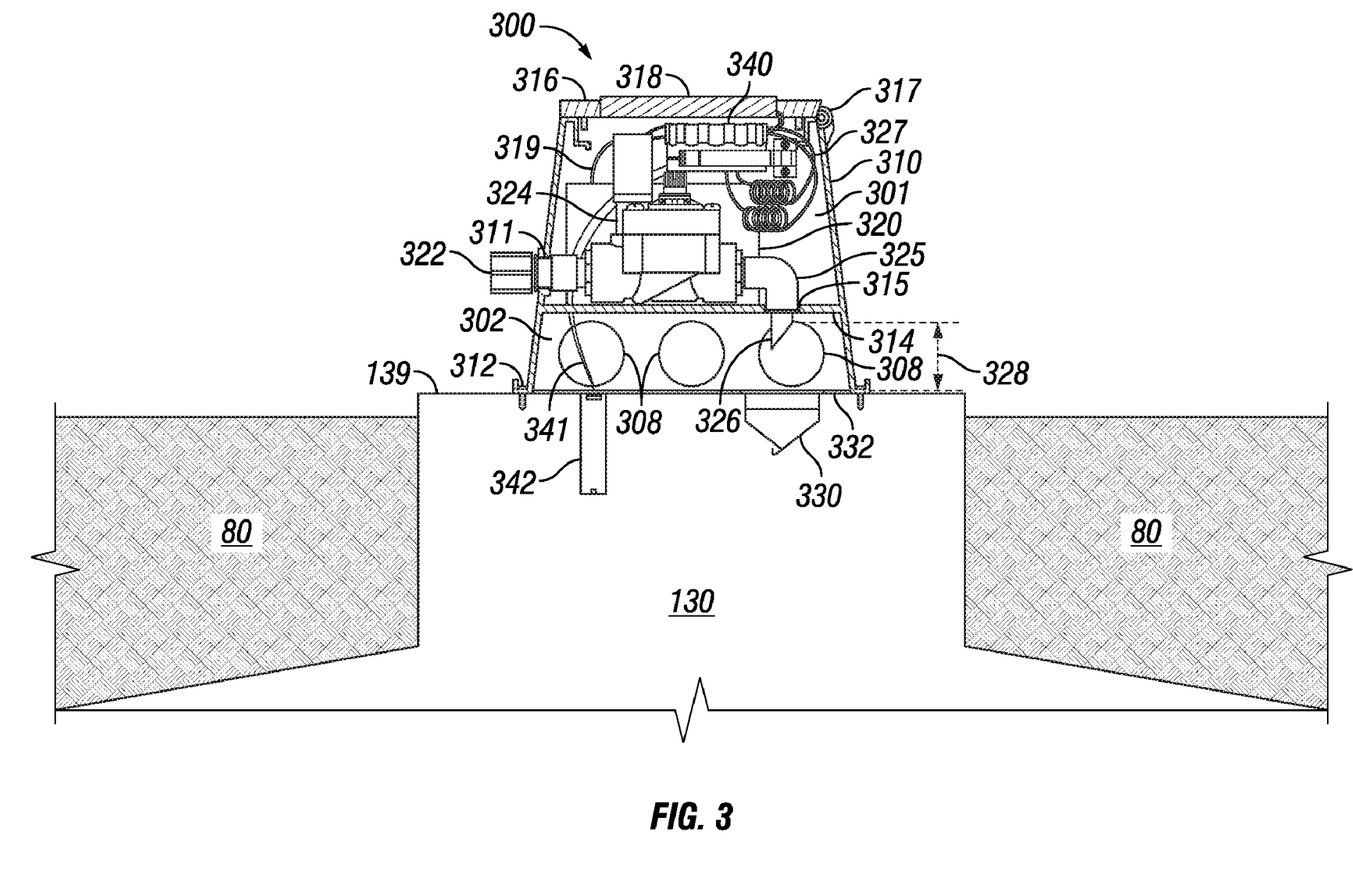
FIG. 3 illustrates a pictorial cutaway diagram of pump cycling apparatus 300 attached to the surface entrance cover 139 of pump tank 130.

FIG. 3 is a pictorial cutaway diagram of pump cycling apparatus 300 attached to the surface entrance cover 139 of pump tank 130. External water source conduit 210 (shown in FIG. 2) connects external separate water source 150 to external water source connection 322 of pump cycling apparatus 300. Housing 310 contains or otherwise houses the components of apparatus 300.

In one example, housing 310 is divided into two chambers, an upper compartment 301 and a lower compartment 302. Upper compartment 301 contains the components needed to regulate the intake of separate water from external separate water source 150. Lower compartment 302 structurally positions an anti-siphon atmospheric air gap 328 to prevent any backflow from the treated water from the pump tank back into the separate water source. Openings to the outside atmosphere 308 are disposed as orifices about the walls of housing 310, opening into lower compartment 302. Openings 308 insure air gap 328 is at atmospheric pressure in order to maintain prevention of backflow. In one example, the sum of the surface areas of the openings 308 exceed the sum of the remaining closed surface area encompassing lower compartment 302 of housing 310. In one example, openings 308 are protected from rodent intrusion and other pests by a screen covering (not illustrated).

Opening 311 in housing 310 receives external water source connection 322 for connection to external separate water source 150. Opening 311 is disposed in the wall of housing 310, opening into upper compartment 301. Anchors at the base of housing 310 allow insertion of anchor screws 312 to affix housing 310 to the surface entrance cover 139 of pump tank 130. Lower compartment 302 is thereby disposed adjacent to the surface entrance cover 139 of pump tank 130.

A bracing member 332 is disposed on the bottom of housing 310, to be disposed adjacent to the surface entrance cover 139 of pump tank 130. Bracing member 332 provides support and positioning for components of the pump cycling apparatus 300 that are to be placed into pump tank 130, through the surface entrance cover 139 of pump tank 130.

In one example, a housing floor 314 separates housing 310 into the two compartments, upper compartment 301 and lower compartment 302.

In one example, a hinged lid 316 disposed on the top side of housing 310 provides access to upper compartment 301. Hinge 317 binds hinged lid 316 to housing 310.

In one example a solar panel 318 is disposed on hinged lid 317 or otherwise integrated into the lid. A rechargeable battery 320 is disposed inside upper compartment 301. Electrical wiring 319 electrically connects solar panel 318 to battery 320, enabling charging of the battery.

Integrated tabs (not numbered) enable the hinged lid to snap into a secure, closed position.

In one example, external water source connection 322 attaches to opening 311 and connects to an electrically controlled valve 324. Valve 324 regulates the receipt, for injection, of water from a source that is separate from the treated water from the aerobic system. While one side of valve 324 is connected to external water source connection 322, the other side of valve 324 is connected to discharge piping 325. Discharge piping 325 acts as a flow redirection member, in one example, redirecting the flow of separate water downward. In one example, a water discharge outlet 326 is affixed to the output opening of discharge piping 325. An opening 315 in flooring 314 provides clearance for discharge piping 325 or water discharge outlet 326. The discharge piping thereby is positioned and arranged to expel or inject the separate water with a downward force into the air gap 328 residing within lower compartment 302.

In one example, the sum of the surface areas of the openings 308 exceed the cross-sectional area of the opening of discharge piping 325. In one example, the sum of the surface areas of the openings 308 exceed the cross-sectional area of the opening of water discharge outlet 326.

Bracing member 332 of housing 310 positions a trap sealer 330 to interface between the lower compartment 102 and pump tank 130. Trap sealer 330 is a water inlet and gas sealing device that is normally closed. The normally closed state prevents gases from pump tank 130 from exiting through the trap sealer and into the atmosphere. Housing 310 positions trap sealer 330 vertically beneath opening 315 in flooring 314 so as to receive the separate water fluids that are injected by discharge piping 325 or water discharge outlet 326.

In one example, the opening to trap sealer 330 is protected from rodent intrusion and other pests by a screen covering (not illustrated).

In one example, the sum of the surface areas of the openings 308 exceed the cross-sectional area of the opening orifice of trap sealer 330.

Bracing member 332 of housing 310 positions an overflow detector 342 to interface between the lower compartment 102 and pump tank 130. Overflow detector 342 is a sensor that is able to detect when the fluid in pump tank 130 reaches a defined level. Overflow detector 342 enables pump cycling apparatus 300 to stop injecting separate water when the pump tank is already too full. Housing 310 positions overflow detector 342 so as to pass through an opening in the surface entrance cover 139 of pump tank 130.

An electronic controller 340 is configured to be able to actuate electrically controlled valve 324 at a pre-determined time and for a pre-determined length of time. Electrical wiring 327 electrically connects electronic controller 340 to electrically controlled valve 324. In one example, a user programs the electronic controller 340 to open valve 324 at a set time each day. In one example, this pre-determined time is set so as to be before the daily activation of ejection pump 138 by aerobic controls 101. The user also programs electronic controller 340 to add external fresh water from a separate source for a set length of time. This pre-determined length of time results in an approximate pre-measured amount of water to be added to the pump tank.

Electrical wiring 341 electrically connects electronic controller 340 to overflow detector 342. In one example, if overflow detector 342 detects that the fluid in pump tank 130 has reached a defined level then electronic controller 340 causes valve 324 to close. This stops the injection of the external fresh water from a separate source into pump tank 130 and prevents an overflow condition.

Figure 4:
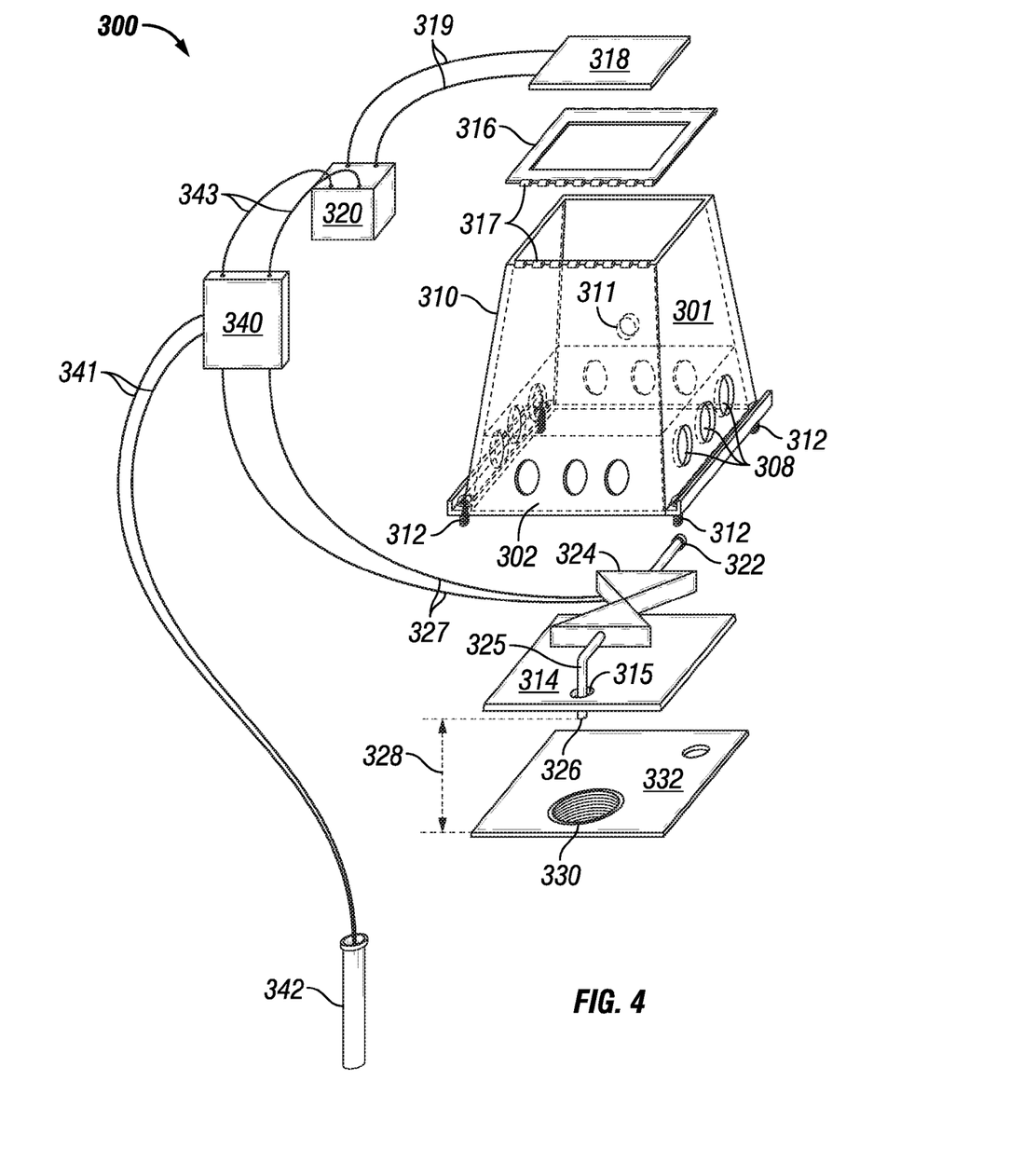
FIG. 4 illustrates an exploded schematic view of pump cycling apparatus 300.

FIG. 4 is an exploded schematic view of pump cycling apparatus 300. Housing 310 in separated into an upper compartment 301 and a lower compartment 302. Housing floor 314 separates the two compartments. An opening 311 in the side of housing 310, into upper compartment 301, enables receipt of fresh water from an external, separate water source. External water source connection 322 receives the externally-provided, separate water. Valve 324, in fluid communication with connection 322, receive the separate water and controls its continued flow. Discharge piping 325 redirects the flow of separate water from valve 324 downward, into lower compartment 302 through opening 315 in floor 314. Bracing member 332 holds a water inlet and gas sealing device, trap sealer 330 under the opening 314 in floor 315. This enables the water inlet & gas sealing device, trap sealer 330 to receive the separate water that is being injected by discharge piping 325. The positioning and arrangement of housing 310, including flooring 314 and bracing member 332 forms a pre-defined vertical air gap 328 distance between discharge piping 325 and the inlet of trap sealer 330. A plurality of openings 308 to the outside atmosphere are disposed about the lower compartment 302 portions of the sides of housing 310.

In one example, water source connection 322 is a three-quarter inch threaded female adapter. In one example, valve 324 is an assembly of a one-inch valve reduced to three-quarter inch on both the inlet and outlet sides. This reduces the turbulence of the injected water exiting the valve and therefore reduces any spray of the injected water as it exits the discharge piping 325. In one example, water discharge outlet 326 is reduced to a half-inch diameter outlet opening. This increases the focus of the water injection.

A hinged lid 316 is disposed on the top side of housing 310, on the upper compartment 301 end, opposite of flooring 314 and lower compartment 302. Hinges 317 rotably affix hinged lid 316 to housing 310.

In one example, a solar panel 318 is affixable to hinged lid 316. In another example, solar panel 318 is affixed to an exterior portion of housing 310. In another example, solar panel 318 is mounted external to housing 310. In one example, solar panel 318 is approximately six inches by six inches, or thirty-six square inches. This size of solar panel is found to provide sufficient charging capacity to maintain power independence of pump cycling apparatus 300.

In one example, solar panel 318 is electrically connected by wires 319 to a rechargeable battery 320. Battery 320 is electrically connected by wires 343 to an electronic controller circuit 340. In one example, battery 320 is a sealed lead-acid battery providing twelve volts (12v) at 7.5 ampere-hour with a twenty (20) hour capacity. In one example, a thirty-six square inch, twelve volt solar panel provides sufficient charging capacity to the 12 volt, 7.5 amp-hour, 20 hour battery.

In one example, an external power source provides electrical power to electronic controller circuit 340.

Electronic controller circuit 340 is electrically connected to valve 324. Electronic controller circuit 340 is further electronically connected by wires 341 to an overflow detector 342. In one example, bracing member 332 positions overflow detector 342; a receiving hole (not numbered) in bracing member 332 receives overflow detector 342.

In one example, overflow detector 342 is an encapsulated electrical contact integrated into a rod. The electrical contact is positioned at the desired or determined level to indicate a full condition of the pump tank. In another example, overflow detector 342 is a float-actuated sensor.

Figure 5:
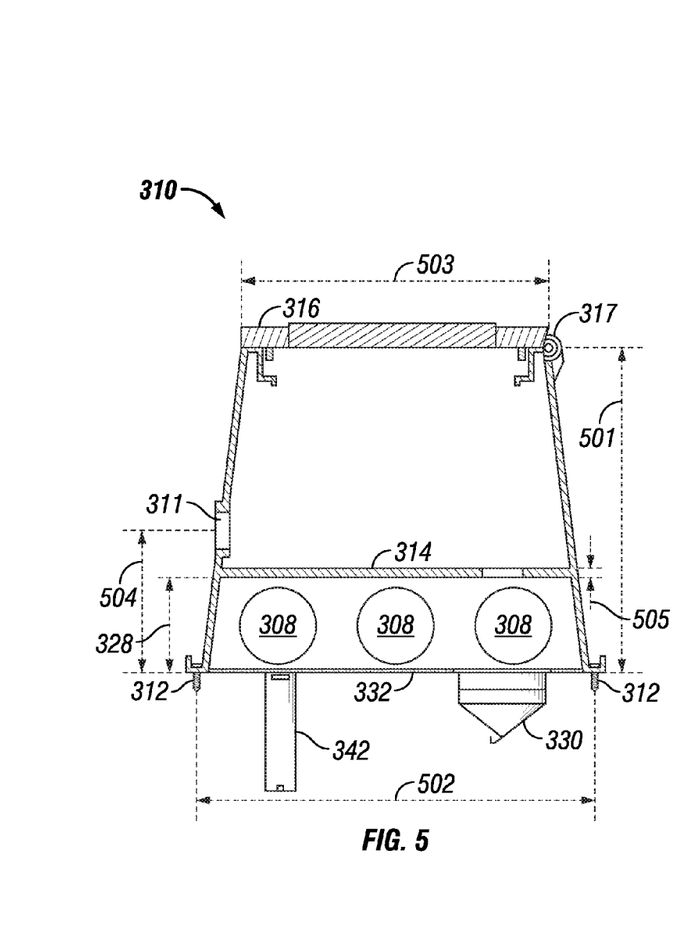
FIG. 5 illustrates a side cut-away view of housing 310 and certain structural components, providing in one example a series of structural dimensional values.

FIG. 5 illustrates a side cut-away view of housing 310 and certain structural components, providing in one example a series of structural dimensional values. In a preferred example, the dimensions of housing 310 include a height dimension 501 of nine inches (9"). In one example, the width of the base of housing 310, the portion containing lower compartment 302 and for attachment to the surface entrance cover 139 of pump tank 130, base width dimension 502, is ten inches (10"). In one example, the side walls of housing 310 angle inward in the upward direction towards the top lid 316, resulting in a top width dimension 503. In one example, the top width dimension 503 is eight inches (8").

In one example, the vertical distance 504 from the base of housing 310 to the center of opening 311 in housing 310 for water source 150 is three and one half inches (3.5"). In one example, the vertical distance from the base of housing 310 to the bottom of floor 314, defining a distance for air gap 328, is two and one half inches (2.5"). In this example, the opening discharge piping 325 is presumed to be at the bottom of floor 314.

In one example, the thickness of floor 314 is one-quarter of an inch (¼").

Figure 6:
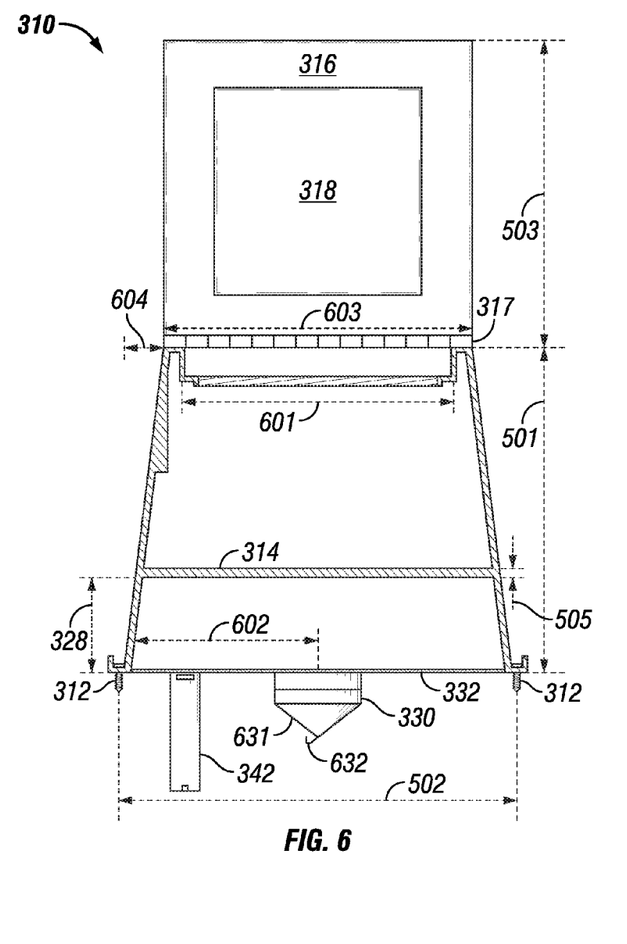
FIG. 6 illustrates a front cut-away view of housing 310 and certain structural components, providing in one example a series of structural dimensional values.

FIG. 6 illustrates a front cut-away view of housing 310 and certain structural components, providing in one example a series of structural dimensional values. In one example, the inner width 601 of the top lid 316 is seven inches (7"). In one example, top lid dimension 603 is eight inches (8"). In one example, the pitch of the sidewalls of housing 310 has a pitch dimension 604 of one inch (1").

In one example, trap sealer 330 is disposed approximately half way between the sidewalls of housing 310, the center distance 603 from the side wall of housing 310 to center of trap sealer 330 being five inches (5").

In one example, trap sealer 330 has a receiving orifice at the base of compartment 302, with a fluid holding chamber 631 extending downward, exterior of compartment 302. An openable drainage orifice 632 is at the bottom of fluid holding chamber 631. In one example, normally closed trap sealer 330 is a flexible funnel-shaped bladder with a curled bottom tip that will uncurl when the bladder is filled with fluid. A hole opens up in the tip upon uncurling of the bottom tip. This allows the fluid in the funnel-shaped bladder to empty through the opening in the tip, the tip functioning as a drainage orifice. Upon drainage of the fluid from the bladder, the material of the trap sealer recurls to close the opening in the tip, placing this drainage orifice into a closed state. In this way, the trap sealer is never is in an open state unless there is a fluid barrier. This prevents gases from escaping through the trap sealer.

In one example, trap sealer 330 uses a spring activated trap door as a drainage orifice. The trap door remains closed unless there is a sufficient amount of fluid pressing down upon the trap door. In one example, the drainage orifice of trap sealer 330 is electrically controlled by detecting a fluid seal in the trap.

Figure 7:
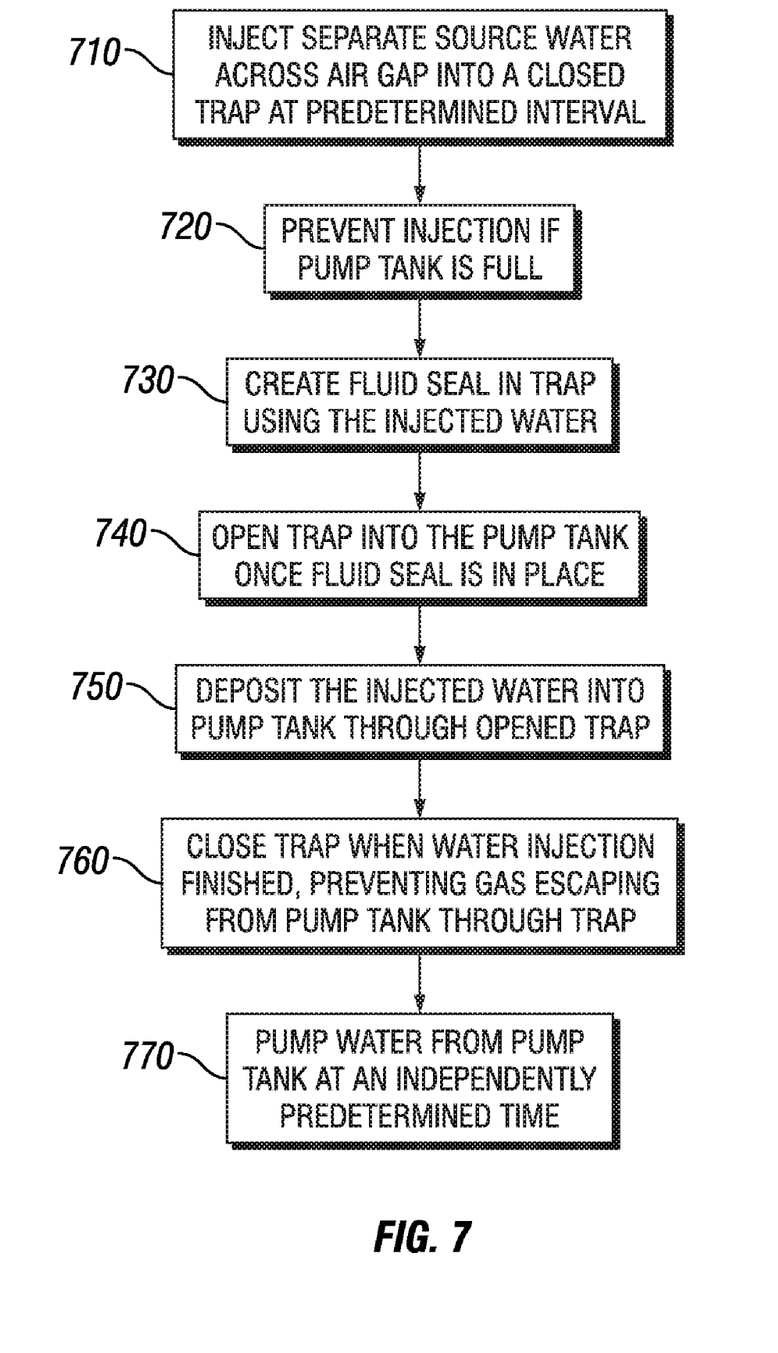
FIG. 7 illustrates a flow chart showing an example of the method for supplementing an aerobic-treated supply of water in an aerobic sewer pump tank using water from a separate source.

FIG. 7 illustrates a flow chart showing an example of the method for supplementing an aerobic-treated supply of water in an aerobic sewer pump tank using water from a separate source. In one example, separate source water is injected across an air gap into a closed trap at a predetermined interval, step 710. In one example, the occurrence of the predetermined start time and predetermined length of time of the interval is controlled. In one example, means for controlling the occurrence of a first predetermined time and a predetermined length of time are provided, in one example, using an electronic controller device. The electronic controller device is set to open a valve at a particular time and to keep the valve open for a set length of time. In one example, means for injecting, for the predetermined length of time commencing at the first predetermined time, include injecting the separate source water through a conduit member, across an air gap, and downward into a closed trap sealer. In one example, the air gap is in communication with the atmosphere, and the vertical distance of the air gap between conduit member and trap sealer is at least 1.5 times the width of the opening of the conduit member. This prevents back flow and back siphonage of liquids from the trap sealer to the conduit member. In another example, the vertical distance of the air gap between conduit member and trap sealer is at least two times the width of the opening of the conduit member.

In a specific example, the source water passes from the valve through a conduit member that redirects the flow towards the receiving orifice of a normally closed trap. In one example, a housing aligns and positions the conduit member and the trap. The flow redirection member is thus positioned and arranged to inject the separate source water into the receiving orifice of the trap and the normally closed trap is positioned and arranged to receive the separate source water injected from the flow redirection member. In one example, the normally closed trap has a fluid holding chamber and an openable drainage orifice. The trap is thus positioned and arranged to prevent gaseous communication from the pump tank to the atmosphere.

Injection is prevented if the pump tank is already full, step 720. In one example, means for preventing injection are provided if the pump tank is filled to a predetermined level. In a specific example, an electronic overflow detector is electrically connected to the controller.

A fluid seal is created in the trap, using the injected water, step 730. In one example, means are provided for creating a fluid seal in the trap sealer, using the injected separate source water. In a specific example, the trap includes a fluid holding chamber. The fluid holding chamber receives the injected water. This creates a barrier between the receiving orifice of the trap and the exiting orifice of the trap. The normally closed trap is therefore positioned and arranged to prevent gaseous communication from the pump tank to the atmosphere through the trap.

The trap is opened into the pump tank once the fluid seal is created, step 740. In one example, means are provided for opening the trap into the pump tank upon creation of the fluid seal. In a specific example, an openable drainage orifice is disposed below or downstream from a fluid holding chamber in the trap. In one example, the pressure of the fluid in the holding chamber opens the openable drainage orifice.

The injected water is deposited into the pump tank once the fluid seal is in place, step 750. In one example, means are provided for depositing the separate source water into the pump tank upon opening the trap. The trap is positioned and arranged to be capable of depositing the separate source water into the pump tank once received. In one example, a brace member of a housing positions the trap.

The trap is closed when the water injection is finished, step 760. In one example, means are provided for closing the trap sealer upon completing the water injection. This prevents gaseous communication from the pump tank to the atmospheric air gap. In one specific example, upon drainage of the fluid from the bladder, the material of the trap recurls to close the opening in the tip of the trap, placing this drainage orifice into a closed state. In this way, the trap sealer is never is in an open state unless there is a fluid barrier. This prevents gases from escaping through the trap sealer.

Water is then pumped from the pump tank at a predetermined time, step 770. In one example, means are provided for pumping the supplemented water from the pump tank at a second predetermined time, in one example, different from the first predetermined time for injecting the supplemental water into the pump tank. In a specific example, the ejection pump in the pump tank of the aerobic treatment system performs this task. In one example, the pumped water, which is now a mixture of the aerobic treated water and supplemented water from a separate source, is sent to a distribution field and used to irrigate vegetation growing in the distribution field.

In an example of installation, a homeowner cuts two holes in the surface entrance cover 139 of their pump tank 130. In an alternate example, a configured surface entrance cover is provided. In an alternate example, the pump cycling apparatus 300 is integrated into the surface entrance cover. Overflow detector 342 is inserted in one hole and trap sealer 330 is inserted into the other hole. The housing 310 of the pump cycling apparatus 300 is screwed or otherwise affixed to the surface entrance cover 139 using anchoring screws 312 or other fasteners.

In one example, pump cycling apparatus 300 is self-powered using its integrated solar panel 318 and rechargeable battery 320. In one example, electrical power from an external source is run to the pump cycling apparatus 300. In another example, a solar panel is mounted at a separate location and the electrical power run to the pump cycling apparatus 300.

In an example, a homeowner runs a hose from a separate faucet to external water source connection 322 of pump cycling apparatus 300. The homeowner programs the electronic timer controller 340 of pump cycling apparatus 300 to use the separate water, commencing at particular time of the day and for a particular amount of time, to fill the pump tank.

In one example, the installation of the pump cycling apparatus 300 is independent of the aerobic treatment system 100, allowing robust retro-fitting of the pump cycling apparatus 300 into the aerobic treatment system 100 to create a better irrigation control system.

In an example of operation, the pump cycling apparatus 300 performs little during times when the aerobic treatment system is providing enough treated water for irrigation. This happens, for example, when the home or building is being used. During these times of sufficient treated water supply, overflow detector 342 senses that there is enough water in the pump tank 130 and prevents the pump cycling apparatus 300 from providing supplemental fresh water from the separate faucet. At other times, such as when the homeowner is on vacation or during the week for a weekend home, the amount of treated water in the pump tank 130 will deplete.

Overflow detector 342 will not cut off the operation of the pump cycling apparatus 300. At a predetermined time during the day, for example at 10 PM, controller 340 will actuate valve 324, causing separate water to be injected into the pump tank 130. This filling will last for a predetermined length of time. Should pump tank 130 fill to a predetermined level while the pump cycling apparatus 300 is filling, then the overflow detector 342 will cause valve 324 to close. This will prevent pump tank 130 from overfilling and provide the correct amount of fluids for irrigation or dispersion to the distribution field 90. In one example, the aerobic treatment system 100 has a separate controller that is independent of the pump cycling apparatus 300. The aerobic treatment system controls 101 activate ejection pump 138 at a set time during the day, for example at 11:30 PM. Since the pump cycling apparatus 300 has already "topped off" pump tank 130 with water from a separate source, there is sufficient fluid in pump tank 130 to adequately irrigate the distribution field 90. Thus, vegetation growing on or in distribution field 90 is no longer in danger of dying due to dry weather during a vacation or during times the home or building is not occupied.

In this way, individuals and businesses that own aerobic systems now have more control over the operation of the irrigation function of the system. In one example, maintenance costs are reduced by preventing costly repairs and service calls due to under-usage. This is particularly important for vacation homes, rental properties, and other situations where there are fluctuations in the amount of waste water entering the aerobic system.

One unexpected advantage is in the generally universal, or at least robust, adaptation of the pump cycling apparatus to a wide range of aerobic systems, regardless of size or location. The pre-engineered pump cycling apparatus is relatively small, compact, and easily installed or retro-fitted on an existing aerobic system. In an example, additional installation of mechanical, wiring, or plumbing is not required to place into operation.

Additionally, through testing of this apparatus, the inventor has found the apparatus to be extremely durable, reliable, and safe. The durability aspect became apparent after withstanding weather, insects, and pets. As of this writing, a test unit has operated without fail. One surprising result is the result of the battery inside the housing constantly charging during daylight hours. The battery, therefore, emits heat and keeps other components from malfunctioning during cold periods. Children have come in close proximity without incident. A most significant result, in one example, however is the decision to install the apparatus on top of the lid of the pump tank, bypassing the aerobic pretreatment and treatment tanks The pretreatment and treatment tanks are almost entirely full of sewage, usually several hundred gallons, not likely to evaporate if left unattended for any length of time As previously mentioned the introduction of fresh water through the aerobic tank would largely or completely kill or flush bacteria crucial to the treatment of the sewage. In such case, the entire system process would have to begin again as if it were a newly installed system.

Therefore, a primary advantage is that this solution is very inexpensive to produce and use when compared to the problems it solves and the potential problems it avoids and eliminates. In terms of favorable environmental impact, the solution decreases water consumption because it continues to use the in-place irrigation cycle and prevents end users from installing additional irrigation to cover their spray field—thereby reducing opportunity for doubling water usage.

The foregoing disclosure is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant in the art having the benefit of the present disclosure. Further, the embodiments described are also intended to explain the best mode for carrying out the invention, and to enable others skilled in the art to utilize the invention and such or other embodiments and with various modifications required by the particular applications or uses of the invention. It is intended that the claims based on this disclosure be construed to include alternative embodiments to the extent that is permitted by prior art.

What is claimed:

1. An apparatus for supplementing an aerobic-treated supply of water in an aerobic sewer pump tank using water from a separate source, the apparatus comprising:
    an electronic controller device configured and arranged to control the occurrence of injection of water from a separate source at a first predetermined time and for a predetermined length of time;
    an electrically actuated control valve member in electrical controlling communication with the electronic controller device;
    an inlet connection member disposed on one end of the control valve;
    a conduit member having one end disposed on the other opening end of the control valve, the conduit member further comprising a flow redirection member;
    a normally closed trap sealer having a receiving orifice, a fluid holding chamber, and an openable drainage orifice, the trap sealer positioned and arranged to prevent gaseous communication from the pump tank to the atmosphere;
        wherein the flow redirection member is positioned and arranged to inject the separate source water into the receiving orifice of the trap sealer;
        wherein the receiving orifice of the trap sealer is positioned and arranged to receive the separate source water injected from the flow redirection member; and
    wherein the normally closed trap sealer is positioned and arranged be capable of depositing the separate source water into the pump tank upon receipt of injected separate source water;
    a housing member positioning and arranging the conduit member and the trap sealer, the trap sealer and conduit member positioned and arranged to prevent liquid flow from the trap sealer to the conduit member; and
    an electronic overflow detector in electrical communication with the controller device; and
        wherein the overflow detector and controller device are arranged and configured to be capable of preventing actuation of the control valve into an open state if the pump tank is filled to a predetermined level.

2. The apparatus of claim 1 further comprising:
an electricity producing solar collector disposed on an outer surface of the housing;
a rechargeable electrical storage battery disposed within the housing; and
wherein the solar collector is in electrical communication with the battery; and
wherein the battery is in electrical communication with the controller.

3. The apparatus of claim 1,
wherein the conduit and the trap sealer are positioned and arranged to form an air gap between the opening of the flow redirection member and the receiving orifice of the trap sealer, the vertical distance from the flow redirection member and the receiving orifice of the trap sealer at least 1.5 times the width of the opening of the flow redirection member; and wherein the housing further comprises orifices positioned and arranged to place the air gap in gaseous communication with the atmosphere.

4. The apparatus of claim 3 further comprising:
an electricity producing solar collector disposed on an outer surface of the housing;
a rechargeable electrical storage battery disposed within the housing; and
wherein the solar collector is in electrical communication with the battery; and
wherein the battery is in electrical communication with the controller.

5. A system for supplementing an aerobic-treated supply of water in an aerobic sewer pump tank using water from a separate source, the system comprising:
means for controlling the occurrence of a first predetermined time and a predetermined length of time using an electronic controller device;
means for injecting, for the predetermined length of time commencing at the first predetermined time, the separate source water through a conduit member, across an air gap, downward into a normally closed trap sealer;
wherein the air gap is in communication with the atmosphere; and
wherein the vertical distance of the air gap between conduit member and trap sealer is at least 1.5 times the width of the opening of the conduit member, whereby liquid flow from the trap sealer to the conduit member is prevented;
a housing member positioning and arranging the conduit member and the trap sealer, the trap sealer and conduit member positioned and arranged to prevent liquid flow from the trap sealer to the conduit member;
means for preventing injection if the pump tank is filled to a predetermined level;
means for creating a fluid seal in the trap sealer using the injected separate source water;
means for opening the trap sealer into the pump tank upon creation of the fluid seal;
means for depositing the separate source water into the pump tank upon opening the trap sealer;
means for closing the trap sealer upon completing the water injection, whereby gaseous communication from the pump tank to the atmospheric air gap is prevented; and
means for pumping the supplemented water from the pump tank at a second predetermined time.

6. The system of claim 5 further comprising:
means for generating electricity using a solar collector;
means for storing the generated electricity in a battery; and
means for supplying the stored electricity to the means for controlling.

7. A method for supplementing an aerobic-treated supply of water in an aerobic sewer pump tank using water from a separate source, the method comprising the steps of:
controlling the occurrence of a first predetermined time and a predetermined length of time using an electronic controller device;
injecting, for the predetermined length of time commencing at the first predetermined time, the separate source water through a conduit member, across an air gap, downward into a closed trap sealer;
wherein the trap sealer and conduit member are positioned and arranged by a housing member to prevent liquid flow from the trap sealer to the conduit member;
wherein the air gap is in communication with the atmosphere; and
wherein the vertical distance of the air gap between conduit member and trap sealer is at least 1.5 times the width of the opening of the conduit member, whereby liquid flow from the trap sealer to the conduit member is prevented;
preventing injection if the pump tank is filled to a predetermined level;
creating a fluid seal in the trap sealer using the injected separate source water;
opening the trap sealer into the pump tank upon creation of the fluid seal;
depositing the separate source water into the pump tank upon opening the trap sealer;
closing the trap sealer upon completing the water injection, whereby gaseous communication from the pump tank to the atmospheric air gap is prevented; and
pumping the supplemented water from the pump tank at a second predetermined time.

8. The method of claim 7 further comprising the steps of:
generating electricity using a solar collector;
storing the generated electricity in a battery; and
supplying the stored electricity to power the controlling step.

* * * * *